(12) United States Patent
Williams et al.

(10) Patent No.: US 9,454,966 B2
(45) Date of Patent: *Sep. 27, 2016

(54) SYSTEM AND METHOD FOR GENERATING USER MODELS FROM TRANSCRIBED DIALOGS

(71) Applicant: AT&T Intellectual Property I, L.P., Atlanta, GA (US)

(72) Inventors: Jason Williams, New York, NY (US); Umar Ali Syed, Rahway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/926,552

(22) Filed: Jun. 25, 2013

(65) Prior Publication Data

US 2013/0289985 A1    Oct. 31, 2013

Related U.S. Application Data

(63) Continuation of application No. 12/552,832, filed on Sep. 2, 2009, now Pat. No. 8,473,292.

(51) Int. Cl.
| | |
|---|---|
| *G10L 15/26* | (2006.01) |
| *G10L 15/07* | (2013.01) |
| *G10L 15/06* | (2013.01) |

(52) U.S. Cl.
CPC ............. *G10L 15/265* (2013.01); *G10L 15/07* (2013.01); *G10L 2015/0631* (2013.01)

(58) Field of Classification Search
CPC ..... G10L 15/00; G10L 15/01; G10L 15/065; G10L 15/07; G10L 15/075; G10L 15/14; G10L 15/22; G10L 15/26; G10L 2015/00; G10L 2015/06; G10L 2015/0635; G10L 2015/22; G10L 17/00; G10L 17/005; G10L 17/06; G10L 17/12; G10L 17/14; G10L 17/26
USPC ................ 704/235, 231, 251, 246, 250, 255
See application file for complete search history.

(56) References Cited

U.S. PATENT DOCUMENTS

| | | | |
|---|---|---|---|
| 5,963,902 A | 10/1999 | Wang | |
| 7,203,652 B1 * | 4/2007 | Heck | ............................. 704/273 |

(Continued)

OTHER PUBLICATIONS

Syed at al. Using Automatically Transcribed Dialogs to Learn User Model in a Spoken Dialog System, Proceedings of ACL-08, pp. 121-124, Jun. 2008.*

*Primary Examiner* — Qi Han

(57) ABSTRACT

Disclosed herein are systems, computer-implemented methods, and computer-readable storage media for generating personalized user models. The method includes receiving automatic speech recognition (ASR) output of speech interactions with a user, receiving an ASR transcription error model characterizing how ASR transcription errors are made, generating guesses of a true transcription and a user model via an expectation maximization (EM) algorithm based on the error model and the respective ASR output where the guesses will converge to a personalized user model which maximizes the likelihood of the ASR output. The ASR output can be unlabeled. The method can include casting speech interactions as a dynamic Bayesian network with four variables: (s), (u), (r), (m), and encoding relationships between (s), (u), (r), (m) as conditional probability tables. At each dialog turn (r) and (m) are known and (s) and (u) are hidden.

20 Claims, 4 Drawing Sheets

(56) References Cited

U.S. PATENT DOCUMENTS 7,692,685 B2 4/2010 Beal et al.
2003/0229497 A1* 12/2003 Wilson et al. ............. 704/270.1
2005/0246165 A1 11/2005 Pettinelli et al.
2006/0161434 A1* 7/2006 Faisman et al. ............. 704/246

* cited by examiner

10

SYSTEM AND METHOD FOR GENERATING USER MODELS FROM TRANSCRIBED DIALOGS

PRIORITY

The present application is a continuation of U.S. patent application Ser. No. 12/552,832, filed Sep. 2, 2009, which is incorporated herein by reference in its entirety.

BACKGROUND

1. Technical Field

The present disclosure relates to training spoken dialog systems and more specifically to generating user models with automatically transcribed dialog data.

2. Introduction

Under ideal conditions, designers of dialog managers in spoken dialog systems would try different dialog management strategies on the actual user population that will be using the spoken dialog system and select the one that works best. However, users are typically unwilling to endure this kind of extensive experimentation because users typically view protracted experimentation as too time consuming, boring, or pointless. One alternative to this tedious experimentation is to build a model of user behavior. Then designers can experiment as much as needed to refine the dialog manager in the spoken dialog system using the model without troubling actual users. Of course, only a high-quality user model which accurately reflects user actions can provide relevant and useful results for such experiments. One known method of building a user model is to estimate a model based on transcribed corpora of human-computer dialogs. However, hundreds or even thousands of transcriptions are required and manual dialog transcription is expensive. Worse, user simulations are created for whole user populations instead of for individuals because of limited quantities of transcribed data for individual users. Consequently, these corpora are frequently too small, too sparse, and/or not specific enough for practical use. Further, spoken dialog system designers must often periodically evaluate the spoken dialog system with real users, which is also expensive and time-consuming.

In the prior art, a human transcriptionist listens to each of hundreds or thousands of user utterances and manually enters the words that were spoken. These transcriptions allow prior art systems to estimate user behavior model and the ASR model to create user simulations. The user behavior model takes the dialog history as input and predicts a distribution over user actions (such as answering a question, remaining silent, hanging up, etc.), and the ASR model takes the user action as input and predicts a distribution over ASR results (such as whether an error is made, a confidence score, etc.).

In practice, ASR errors are isolated and independent, so it is feasible to build the ASR model with relatively few parameters (fewer than a thousand transcriptions is often sufficient). However, user behavior depends heavily on the dialog history, and capturing this in the user behavior model requires much more training data.

One problem with the prior art approach is that transcribing dialog data is slow and expensive, so the number of transcriptions available for training the user behavior model is limited. As a result, user behavior models are impoverished, and cannot effectively account for dialog history. Moreover, these user behavior models cover a whole population of users, and do not model individual differences. Since dialog systems are trained on user simulations, these limitations set an upper-bound on the effectiveness of the optimization process. To realize the potential gains of machine-learning approaches to building dialog systems, user behavior models need to be estimated from many more dialogs than can feasibly be transcribed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and computer-readable storage media for generating personalized user models. The method includes receiving automatic speech recognition (ASR) output of a speech interactions with a user, receiving an ASR transcription error model characterizing how ASR transcription errors are made, generating guesses of a user model via an expectation maximization (EM) algorithm based on the error model and the respective ASR output, where the guesses will converge to a personalized user model which maximizes the likelihood of the ASR output. The ASR output can be unlabeled. The method can include casting speech interactions as a dynamic Bayesian network with four variables: (s), (u), (r), (m), and encoding relationships between (s), (u), (r), (m) as conditional probability tables. At each dialog turn (r) and (m) are known and (s) and (u) are hidden. The method can include generating the guesses of the true transcription and a user model by alternating the following steps iteratively until a threshold is met: guessing the true transcription from the current guess of the user model, and guessing the user model from the current guess of the true transcription.

The principles disclosed herein can provide for efficient creation of user simulations which can be used to automatically optimize spoken dialog systems. In one aspect, a dialog system interacts with a user simulation for many dialogs (thousands or even millions), exploring different strategies and making incremental improvements based on the interactions. If the user simulation is an accurate replication of real users, then automatic optimization produces much better systems faster and at a lower cost than manual design.

A system operating according to the principles disclosed herein can apply Expectation Maximization (EM) to models of users' behavior when the system only has the output from the speech recognizer and no authoritative, transcribed version of what the user said. The system can learn individual user models associated with a unique user identifier, such as a user voiceprint, telephone number, etc.

The system applies machine learning to automatically optimize dialog design. An optimization algorithm controls a processor to explore many candidate dialog plans to ultimately yield an optimal dialog design. Machine learning techniques consistently outperform hand-designed dialog systems, but require thousands or even millions of interactions to attain an optimal solution. Since this is typically infeasible with groups of real users and certainly infeasible with an individual user, machine learning techniques rely on user simulations. A user simulation consists of two elements: a user behavior model, which simulates the actions that users take in the dialog, and the automatic speech recognition (ASR) model, which simulates speech recognition errors.

In one embodiment, a computer-readable storage medium stores a computer program having instructions for controlling a processor to generate a personalized dialog system. The instructions can include receiving a user model personalized for a specific user. The personalized user model is created by receiving automatic speech recognition (ASR) output of a plurality of speech interactions with the specific user, receiving an ASR transcription error model characterizing how ASR transcription errors are made, generating guesses of a true transcription via an expectation maximization (EM) algorithm based on the error model and the respective ASR output, each guess corresponding to one of the plurality of speech interactions with the specific user, and generating the user model personalized for the specific user based on the guesses. The instructions include building a personalized dialog system for the specific user based on the received personalized user model. The personalized dialog system can the conduct a dialog with the specific user, or with a similar user(s).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
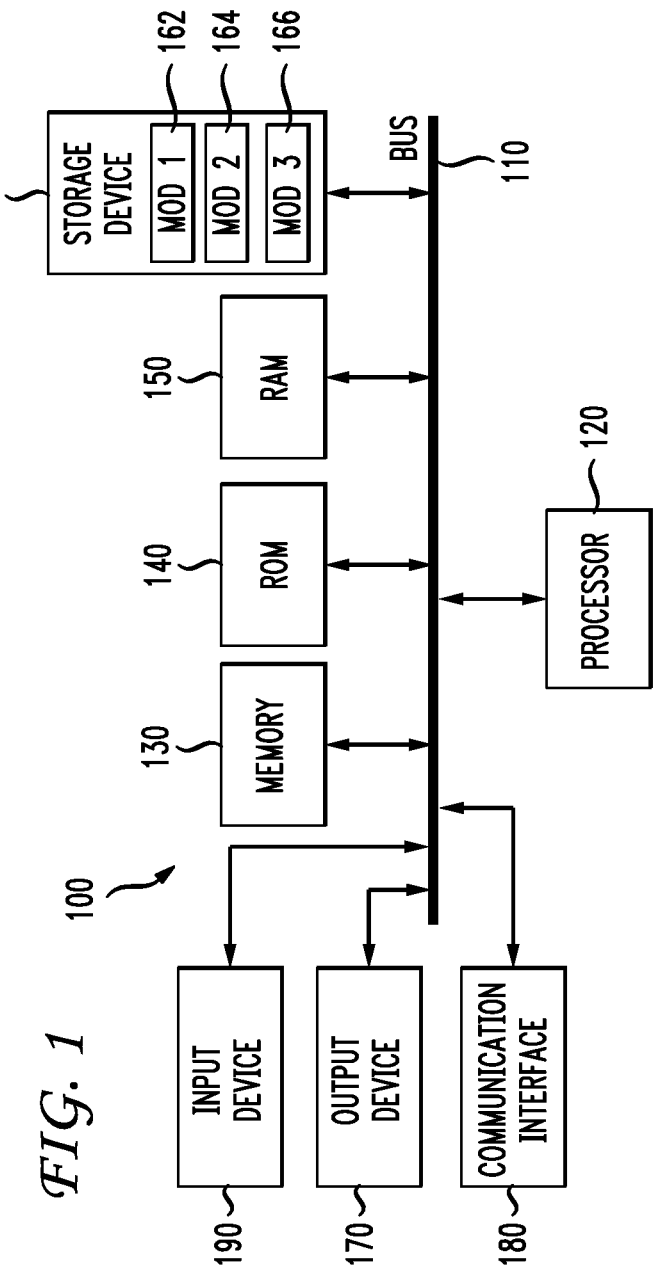
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
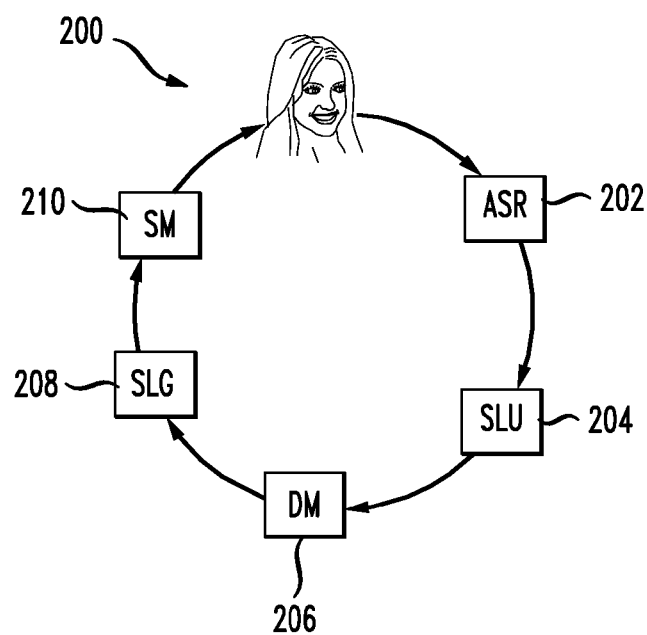
FIG. 2 illustrates a functional block diagram of an exemplary natural language spoken dialog system.

FIG. 2 illustrates a functional block diagram of an exemplary natural language spoken dialog system. The principles of enriched spoken language translation described herein can be implemented as a part of or operate in connection with a natural spoken language dialog system to provide, for example, real-time translation of speech in an automated natural speech interface via telephone. In this manner, a spoken dialog system which is tuned to pick up on and understand prosodically prominent segments of speech can still be effective with foreign languages processed through a translation module. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present invention focuses on innovations related to the dialog management module 206 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of DM module 206 is to interact in a natural way and help the user to achieve the task that the system is designed to support. DM module 206 receives the meaning of the speech input from SLU module 204 and determines an action, such as, for example, providing a response, based on the input. SLG module 208 generates a transcription of one or more words in response to the action provided by DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

A system configured to practice the method can estimate a user behavior model on an arbitrary number of untranscribed dialogs without human effort or intervention. First, the system estimates an ASR model on a small set of transcribed dialogs in the conventional way. Then, the system estimates a user behavior model from an arbitrary (much larger) number of untranscribed dialogs using Expectation-Maximization (EM). EM is a general-purpose machine learning technique to estimate the conditional probabilities of hidden variables. EM may employ a gradient descent approach. In this case, EM finds the parameters of the user behavior model which maximize the likelihood of the dialog data given the estimated ASR model.

The system can cast the dialog as a dynamical Bayesian network with 4 variables: (s), (u), (r), and (m). (s) is the user's state, which aggregates the user's view of the dialog history and the user's goals. (u) is the user's (true) action. (r) is the possibly erroneous speech recognition output. (m) is the dialog system's action. The Bayesian network encodes relationships between these variables as conditional probability tables. The speech recognition result depends on the user's action, and is expressed as $P(r|u)$. At each turn in the dialog, the ASR result (r) and the dialog system's action (m) are given, and the user's state (s) and the user's action (u) are hidden. Given a corpus of dialogs, EM can estimate the conditional probability tables for $P(u|s,m)$. Transcriptions are not required because the conditional probability table for the speech recognition output is provided.

Of course, if the number of simulated training dialogs and actual transcribed training dialogs are the same, EM is not as accurate as using real transcriptions. However, with EM the system can use far more dialogs. This has two consequences. First, with EM the system can reliably train more sophisticated user models (which require more internal parameters) than would be possible with the conventional approach. Second, with EM the system can build behavior models for individual users, for which no transcriptions exist at all.

Figure 3:
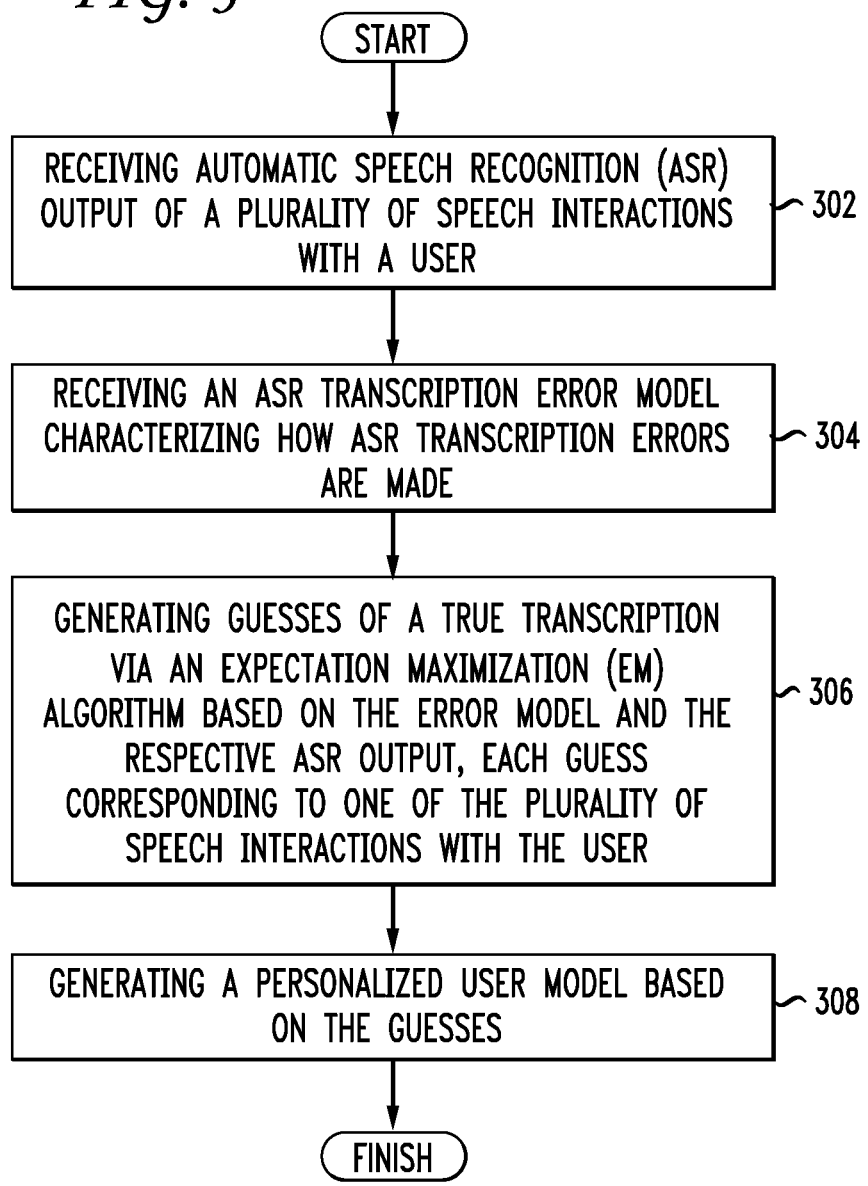
FIG. 3 illustrates an exemplary method embodiment.

Having disclosed a basic system, fundamental concepts, and natural language dialog components, the disclosure now turns to the exemplary method embodiment shown in FIG. 3. For the sake of clarity, the method is discussed in terms of an exemplary system 100 such as is shown in FIG. 1 configured to practice the method.

The system 100 first receives automatic speech recognition (ASR) output of speech interactions with a user (302). As described above, the ASR output can be unlabeled.

The system 100 receives an ASR transcription error model characterizing how ASR transcription errors are made (304). The system 100 generates guesses of a true transcription and a user model via an expectation maximization (EM) algorithm based on the error model and the respective ASR output. In one embodiment, the system 100 alternates between generating a guess of the true transcription and of the user model. The current guess of one type is used to generate the next guess of the other type. The system 100 can iteratively generate guesses until the system meets a threshold. Further, the EM algorithm can estimate conditional probabilities of hidden variables. The system can generate the guesses based at least in part on a set of manual transcriptions of speech interactions with the user. The manual transcriptions can be less numerous than the ASR output. Based on the error model, the system generates guesses of the true transcription and of the user model based on ASR output, which is noisy and/or ASR logs from user interactions such as ASR hypothesis, state information, etc.

The system 100 generates a personalized user model based on the guesses (308). The system can generate or augment the personalized user model based on a previously generated personalized user model, a user model from a similar user, or a template user model. The generated personalized user model can apply to an individual user, a small group of individual users, and/or an entire population segment of similar users. In one aspect, the system personalizes a generic or population-specific user model based on an individual user simulation. The system can iteratively improve, tweak, or otherwise modify a user model until a certain threshold is met or until the system runs out of actual or simulated experimentation data.

The system 100 can further cast the speech interactions as a dynamical Bayesian network with four variables: (s), (u), (r), and (m) and encode relationships between the (s), (u), (r), and (m) as conditional probability tables. In this variation, (r) and (m) are known and (s) and (u) are hidden at each dialog turn. The system can also generate, augment, or improve the personalized user model based on a template user model, a previously generated personalized user model, or a user model from a similar user. The system can also recognize additional speech from the user based on the personalized speech model.

This approach does not assume access to correct transcriptions, but instead uses a model of how errors are made in transcription. A system configured to practice the method disclosed herein infers the model of user actions based on EM, and not the model of user goal evolution. The system builds user models without requiring any manually transcribed dialogs, although the system can augment a model which is based in whole or in part on manually transcribed dialogs. Instead this approach uses dialogs transcribed by an ASR engine, such as the ASR module 202 shown in FIG. 2. All ASR is error-prone to some degree, so the system cannot assume that the transcripts will accurately reflect users' actions or internal states. To handle this uncertainty, the system employs an EM algorithm that treats this information as unobserved data. While this approach does not require manually transcribed dialogs, it does require a confusion model for the ASR engine. Obtaining a confusion model is generally easier, faster, and cheaper than manually transcribing dialogs.

User models produced by the EM approach replicate the true distribution of user actions as accurately as models estimated from manually transcribed data, and more accurately than models estimated from an automatically transcribed data set in which transcription errors and unobserved data are disregarded. One experiment used a voice-controlled telephone directory application as a test bed.

Before the system can estimate a user model, a broader model of human-computer dialogs must be defined, of which the user model is just one component. One exemplary dialog model is the probabilistic dialog model 400 depicted schematically as a graphical model in FIG. 4. Other suitable dialog models can replace this exemplary model. The boxed variables 402, 408, 412 are observed. The circled variables 404, 406, 410 are unobserved. Directed edges denote conditional dependencies among the variables.

In our dialog model, a dialog transcript x consists of an alternating sequence of system actions and observed user actions: $x=(S_0, \tilde{A}_0, S_1, \tilde{A}_1, \ldots )$. Here $S_t$ 402 denotes the system action, and $\tilde{A}_t$ 408 denotes the output of the ASR engine when applied to the true user action $A_t$ 406.

The model generates a dialog transcript x by performing the following steps. At each time t, the system action is $S_t$ 402 and the unobserved user state is $U_t$ 404. The user state summarizes the hidden state of the dialog that, due to ASR confusions, is known with certainty only to the user. Its precise definition varies with the dialog system being modeled. Conditioned on $(S_t, U_t)$, the user draws an unobserved action $A_t$ 406 from a distribution $Pr(A|S_t, U_t, \theta)$ parameterized by an unknown parameter $\theta$. This distribution is the user model the system estimates. For each user action $A_t$ 406, the ASR engine produces a hypothesis $\tilde{A}_t$ 408 of what the user said, drawn from a distribution $Pr(\tilde{A}|A_t)$, which is the ASR confusion model. The system updates the user state $U_t$ 404 to $U_{t+1}$ 410 according to a "bookkeeping" distribution $Pr(U|S_{t+1}, U_t, A_t, \tilde{A}_t)$. The system outputs the next system action $S_{t+1}$ 412 according to its dialog management policy.

Figure 4:
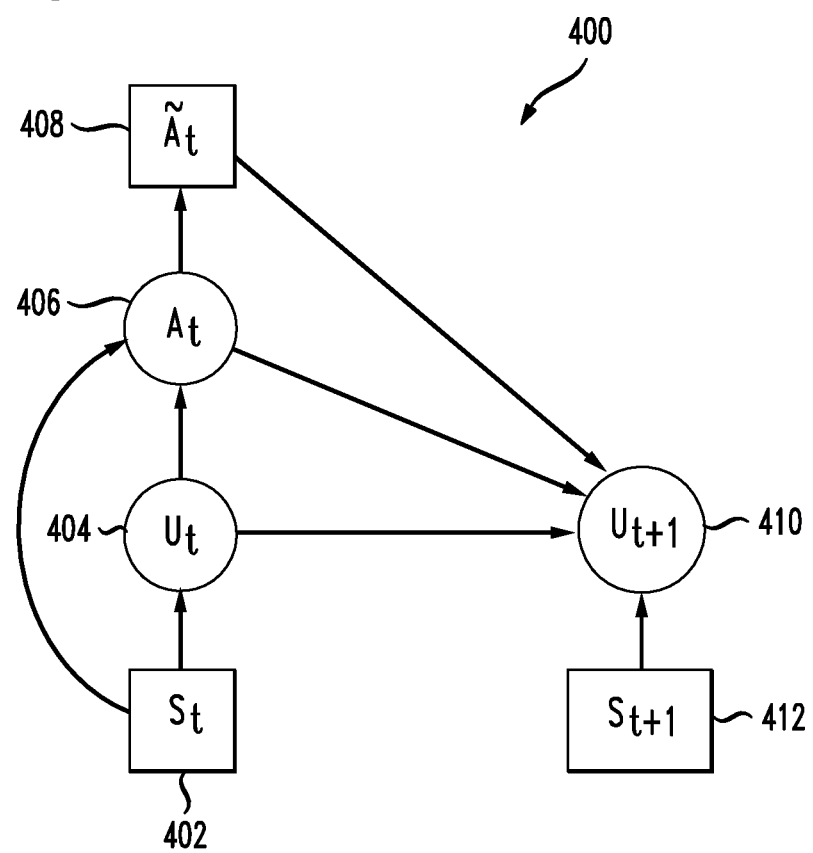
FIG. 4 illustrates a probabilistic graphical model of a human-computer dialog.

Many dialogs are longer than two turns, but based on an assumption that all the conditional distributions are stationary or do not vary over time, FIG. 4 suffices to describe the entire dialog model.

Given a set of dialog transcripts X, the system finds a set of parameters $\theta^*$ that maximizes the log-likelihood of the observed data based on the following equation:

$$\theta^* = \underset{\theta}{\mathrm{argmax}} \log Pr(X \mid \theta) \qquad \text{Equation 1}$$

The values of $S_t$, $U_t$, $A_t$ and $\tilde{A}_t$ are all assumed to belong to finite sets, and so all the conditional distributions in our model are multinomials. Hence $\theta$ is a vector that parameterizes the user model according to $Pr(A|S, U, \theta)=\theta_{asu}$. The only other unknown distribution is the ASR confusion model $Pr(\tilde{A}|A)$, which is relatively straightforward to estimate. For example, ASR models that assume a simple confusion rate and uniform substitutions (which can be estimated from small number of transcriptions) have been used to train dialog systems which outperform traditional systems.

Unfortunately, directly computing θ* in Equation 1 is intractable. However, the system can efficiently approximate θ* via an expectation-maximization (EM) procedure. For a dialog transcript x, let y be the corresponding sequence of unobserved values: $y=(U_0, A_0, U_1, A_1, \ldots)$. Let Y be the set of all sequences of unobserved values corresponding to the data set X. Given an estimate $\theta^{(t-1)}$, a new estimate $\theta^{(t)}$ is produced by the following equation:

$$\theta^{(t)} = \arg\max_\theta E_Y[\log Pr(X, Y \mid \theta) \mid X, \theta^{(t-1)}] \quad \text{Equation 2}$$

The expectation in Equation 2 is taken over all possible values for Y. Both the expectation and its maximization are easy to compute because the dialog model has a chain-like structure that closely resembles a Hidden Markov Model, and so a forward-backward procedure can be employed. Under fairly mild conditions, the sequence $\theta^{(0)}, \theta^{(1)}, \ldots$ converges to a local maximum estimate of θ*.

One experiment designed to test the approach set forth herein applied these principles to a voice-controlled telephone directory. These principles can be used in a wide variety of other applications. Users can call the directory system and provide the name of a callee they wish to be connected to. The system then requests additional information from the user, such as the callee's location and type of phone (office, cell). Here is a small fragment of a typical dialog with the system:

$S_0$=First and last name?
$A_0$="John Doe"
$\tilde{A}_0$=Jane Roe
$S_1$=Jane Roe. Office or cell?
$A_1$="No, no, John Doe"
$\tilde{A}_1$=No
$S_2$=First and last name?
...

Because the telephone directory has many names, the number of possible values for $A_t$, $\tilde{A}_t$, and $S_t$ is potentially very large. To control the size of the model, the system lumped many user actions together into generic placeholders such as $A_t$=FirstNameLastName. After doing this, $A_t$ and $\tilde{A}_t$ had 13 possible values, and $S_t$ had 14 possible values.

Choosing a definition for the user state $U_t$ is a crucial design decision. Ideally, the user state should capture all the unobserved features of the dialog that affect the user's behavior. At the same time, the user state should have a manageable number of dimensions, or accurately estimating the parameter value θ* from a limited data set will be impossible.

In the case of the experimental directory application, the user state consists of three bits: one bit indicating whether the system has correctly recognized the callee's name, one bit indicating whether the system has correctly recognized the callee's "phone type" (office or cell), and one bit indicating whether the user has said the callee's geographic location (needed for disambiguation when several different people share the same name). The "bookkeeping" distribution $Pr(U \mid S_{t+1}, U_t, A_t, \tilde{A}_t)$ simply updates the user state after each dialog turn. For example, the "name is correct" bit of $U_{t+1}$ is set to 0 when $S_{t+1}$ is a confirmation of a name which doesn't match $A_t$.

The user model is a multinomial distribution $Pr(A \mid S_t, U_t, \theta)$ parameterized by a vector θ. Based on the number system actions, user actions, and user states, θ is a vector of 1344 unknown parameters.

In two sets of experiments on the telephone directory application, one used simulated data, and the other used dialogs collected from actual users. Both sets of experiments assumed that all the distributions in FIG. 4, except the user model, are known. The ASR confusion model was estimated by transcribing a small set of dialogs and calculating the frequency with which the ASR engine made transcription errors. The probabilities $Pr(\tilde{A} \mid A)$ were then constructed by assuming that, when the ASR engine makes an error recognizing a user action, it substitutes a different action uniformly at random. Importantly, the number of transcriptions required to estimate this model was small and fixed relative to the size of the automatically transcribed corpora used to estimate the user models.

The user model is $Pr(A \mid S, U, \theta) = \theta_{asu}$. In this set of experiments, a reasonable value for θ was chosen, and the system generated synthetic dialogs by following the probabilistic process depicted in FIG. 4. The value for θ was chosen by examining a manually transcribed set of dialogs. In this way, the system was able to create synthetic training sets of varying sizes, as well as a test set of 1,000 dialogs. Each generated dialog d in each training/test set consisted of a sequence of values for all the observed and unobserved variables $d=(S_0, U_0, A_0, \tilde{A}_0, \ldots)$.

For a training/test set D, let $K^D_{asu}$ be the number of times t, in all the dialogs in D, that $A_t=a$, $S_t=s$, and $U_t=u$. Similarly, let $\tilde{K}^D_{as}$ as be the number of times t that $\tilde{A}_t=a$ and $S_t=s$. For each training set D, θ can be estimated using three methods. In the Oracle method, let θ be the maximum likelihood estimate using manually transcribed data based on the following equation:

$$\theta_{asu} = \frac{K^D_{asu}}{\sum_a K^D_{asu}} \quad \text{Equation 3}$$

In the naïve method, let θ be the maximum likelihood estimate using automatically transcribed data based on the following equation. This approach ignores transcription errors and assumes that user behavior depends only on the observed data.

$$\theta_{asu} = \frac{\tilde{K}^D_{as}}{\sum_a \tilde{K}^D_{as}} \quad \text{Equation 4}$$

In the EM approach, let θ be the estimate produced by the EM algorithm described above in Equation 2 and let D be the test set. Each user model can be evaluated by calculating the normalized log-likelihood of the model with respect to the true user actions in D:

$$l(\theta) = \frac{\sum_{a,s,u} K^D_{asu} \log \theta_{asu}}{|D|} \quad \text{Equation 5}$$

$l(\theta)$ is essentially a measure of how well the user model parameterized by θ replicates the distribution of user actions in the test set. The normalization allows for easier comparison across data sets of differing sizes.

The EM method has to estimate a larger number of parameters than the Naïve method (1344 vs. 168 in this example), but after observing enough dialogs, it is able to leverage the hidden user state to learn a better model of user behavior.

The system can estimate user models from automatically transcribed dialog corpora by modeling dialogs within a probabilistic framework that accounts for transcription errors in a principled way.

This approach may lead to many interesting future applications. For example, it can be used for continuous learning of a user model while the dialog system is on-line, enabling automatic adaptation to a specific user or to a specific group of users. These principles can also allow researchers to experiment with more sophisticated user model formulations, using very large (automatically transcribed) data sets.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many different types of computer system configurations and different operating systems, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may reside in local and/or remote memory storage devices.

The various embodiments described above are provided by way of illustration only and should not be construed to limit the scope of the disclosure. For example, the principles herein may be applied to automated telephone-based customer service, automated telephone directories, voice-enabled online gaming, IPTV, smart phones, multi-modal search applications on devices such as the Apple iPhone, and many other areas. Those skilled in the art will readily recognize various modifications and changes that may be made to the principles described herein without following the example embodiments and applications illustrated and described herein, and without departing from the spirit and scope of the disclosure.

We claim:
1. A method comprising:
receiving speech recognition output associated with speech from a user;
receiving an error model characterizing how automatic speech recognition transcription errors are made;
generating, via a processor, guesses of a true transcription based on an error model-based algorithm, wherein the error model-based algorithm uses the error model and the speech recognition output; and
generating, based on the guesses of the true transcription, a personalized user model associated with a user voiceprint of the user, wherein the generating of the personalized user model comprises iteratively guessing the true transcription until a threshold is met.

2. The method of claim 1, wherein generating of the guesses further comprises repeating, until a threshold is met, steps comprising:
guessing the true transcription from a current guess of the personalized user model, to yield a current guess of the true transcription; and
guessing the personalized user model based on the current guess of the true transcription.

3. The method of claim 1, wherein the error model-based algorithm estimates conditional probabilities of hidden variables.

4. The method of claim 1, wherein generating of the guesses is further based on a set of manual transcriptions of speech interactions with the user.

5. The method of claim 1, wherein the personalized user model comprises a Bayesian network.

6. The method of claim 1, further comprising generating a personalized automatic speech recognition model based on the personalized user model.

7. The method of claim 1, further comprising recognizing additional speech from the user using the personalized user model.

8. The method of claim 7, further comprising iteratively improving the personalized user model based on the additional speech.

9. A system comprising:
a processor; and
a computer-readable storage medium having instructions stored which, when executed by the processor, cause the processor to perform operations comprising:
receiving speech recognition output associated with speech from a user;
receiving an error model characterizing how automatic speech recognition transcription errors are made;

generating guesses of a true transcription based on an error model-based algorithm, wherein the error model-based algorithm uses the error model and the speech recognition output; and generating, based on the guesses of the true transcription, a personalized user model associated with a user voiceprint of the user, wherein the generating of the personalized user model comprises iteratively guessing the true transcription until a threshold is met.

10. The system of claim 9, wherein generating of the guesses further comprises repeating, until a threshold is met, steps comprising:

guessing the true transcription from a current guess of the personalized user model, to yield a current guess of the true transcription; and guessing the personalized user model based on the current guess of the true transcription.

11. The system of claim 9, wherein the error model-based algorithm estimates conditional probabilities of hidden variables.

12. The system of claim 9, wherein generating of the guesses is further based on a set of manual transcriptions of speech interactions with the user.

13. The system of claim 9, wherein the personalized user model comprises a Bayesian network.

14. The system of claim 9, the computer-readable storage medium having additional instructions stored which, when executed by the processor, cause the processor to perform operations comprising generating a personalized automatic speech recognition model based on the personalized user model.

15. The system of claim 9, the computer-readable storage medium having additional instructions stored which, when executed by the processor, cause the processor to perform operations comprising recognizing additional speech from the user using the personalized user model.

16. The system of claim 15, the computer-readable storage medium having additional instructions stored which, when executed by the processor, cause the processor to perform operations comprising iteratively improving the personalized user model based on the additional speech.

17. A computer-readable storage device having instructions stored which, when executed by a computing device, result in the computing device performing operations comprising:

receiving speech recognition output associated with speech from a user;

receiving an error model characterizing how automatic speech recognition transcription errors are made;

generating guesses of a true transcription based on an error model-based algorithm, wherein the error model-based algorithm uses the error model and the speech recognition output; and generating, based on the guesses of the true transcription, a personalized user model associated with a user voiceprint of the user, wherein the generating of the personalized user model comprises iteratively guessing the true transcription until a threshold is met.

18. The computer-readable storage device of claim 17, wherein generating of the guesses further comprises repeating, until a threshold is met, steps comprising:

guessing the true transcription from a current guess of the personalized user model, to yield a current guess of the true transcription; and guessing the personalized user model based on the current guess of the true transcription.

19. The computer-readable storage device of claim 17, wherein the error model-based algorithm estimates conditional probabilities of hidden variables.

20. The computer-readable storage device of claim 17, wherein generating of the guesses is further based on a set of manual transcriptions of speech interactions with the user.

* * * * *